United States Patent
Hsu et al.

(10) Patent No.: US 7,621,020 B2
(45) Date of Patent: Nov. 24, 2009

(54) PIVOTAL-AXIS CHANGING HINGE

(75) Inventors: Jia-Hao Hsu, Shulin (TW); Ting-Hsien Wang, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 225 days.

(21) Appl. No.: 11/796,831

(22) Filed: Apr. 30, 2007

(65) Prior Publication Data

US 2008/0263827 A1    Oct. 30, 2008

(51) Int. Cl.
*E05D 7/00*    (2006.01)
(52) U.S. Cl. .................................... 16/340; 16/239
(58) Field of Classification Search .................... 16/239, 16/229, 319, 321, 333, 357, 380, 340, 338, 16/337, 389, 392, 374; 361/679.27, 679.26, 361/679.28; 455/575.3; 379/93.17, 433.13; 248/922
See application file for complete search history.

(56) References Cited

U.S. PATENT DOCUMENTS

| | | | |
|---|---|---|---|
| 6,568,034 B2 * | 5/2003 | Cho | 16/337 |
| 6,813,813 B2 * | 11/2004 | Lu et al. | 16/342 |
| 7,222,396 B2 * | 5/2007 | Lu et al. | 16/340 |
| 2003/0097732 A1 * | 5/2003 | Kim | 16/337 |
| 2007/0174996 A1 * | 8/2007 | Lu et al. | 16/340 |
| 2007/0199179 A1 * | 8/2007 | Wang | 16/340 |

* cited by examiner

*Primary Examiner*—Victor Batson
*Assistant Examiner*—Rowland D Do
(74) *Attorney, Agent, or Firm*—William E. Pelton, Esq.; Cooper & Dunham LLP

(57) ABSTRACT

A pivotal-axis changing hinge has a stationary leaf, a pivoting leaf, a pintle assembly and a cam. The pivoting leaf and stationary leaf are respectively connected securely to a cover having a rear edge and a keyway and a base having an elongated gudgeon. A parabolic edge is formed at an edge near the elongated gudgeon. The pintle assembly is mounted through the keyway and pivotally through the elongated gudgeon to allow the leaves to pivot along a pivotal axis of the pintle assembly. The cam is mounted on the pintle assembly, rotates simultaneously with the pintle assembly and has a protrusion mounted slidably on the parabolic edge to move the pintle assembly and the cover perpendicularly away from the base when the cover is pivoting. Consequently, the proximal edge of the cover is kept from colliding with the base and the rotating angle of the cover is expanded.

9 Claims, 6 Drawing Sheets

PIVOTAL-AXIS CHANGING HINGE

BACKGROUND OF THE INVENTION

1. Field of the Invention

The present invention relates to a hinge, and more particularly to a pivotal-axis changing hinge that allows a cover to be pivotally mounted to a base without the rotation of the cover being restricted by the base.

2. Description of Related Art

Portable electronic devices like calculators, translation machines, notebook computers, mobile phones and the like comprise a base, a cover and at least one hinge mounted between the base and the cover.

The hinge connects the cover to the base and allows the cover to rotate relative to the base. A hinge comprises two leaves and a pintle assembly. The leaves are respectively connected securely to the cover and the base and have pivoting holes that correspond to each other. The pintle assembly has a pivotal axis, is mounted through the pivoting holes of the leaves allowing the leaves to pivot along the pivotal axis of the pintle assembly.

However, if the base or the cover is thick, a proximal edge of the cover will inevitably hit the base when pivoting, restricting the rotating angle of the cover and causing inconvenience.

To overcome the shortcomings, the present invention provides a pivotal-axis changing hinge to obviate or mitigate the aforementioned problems.

SUMMARY OF THE INVENTION

The main objective of the present invention is to provide a pivotal-axis changing hinge having a pivotal axis. The pivotal axis can change position gradually during opening to prevent the cover from hitting a base.

The pivotal-axis changing hinge in accordance with the present invention comprises a stationary leaf, a pivoting leaf, a pintle assembly and a cam.

The pivoting leaf and stationary leaf are respectively mounted to a cover and a base of a portable electronic device.

The pintle assembly is mounted through the keyway and pivotally through the elongated gudgeon.

The cam is mounted on the pintle assembly, rotates simultaneously with the pintle assembly and has a protrusion mounted slidably on the parabolic edge.

When the cover is opened away relative to the base, the hinge gradually changes its pivotal axis which lifts the pintle assembly perpendicularly moving away from the base. Therefore, the proximal edge of the cover is kept from hitting the base and the rotating angle of the cover is expanded.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
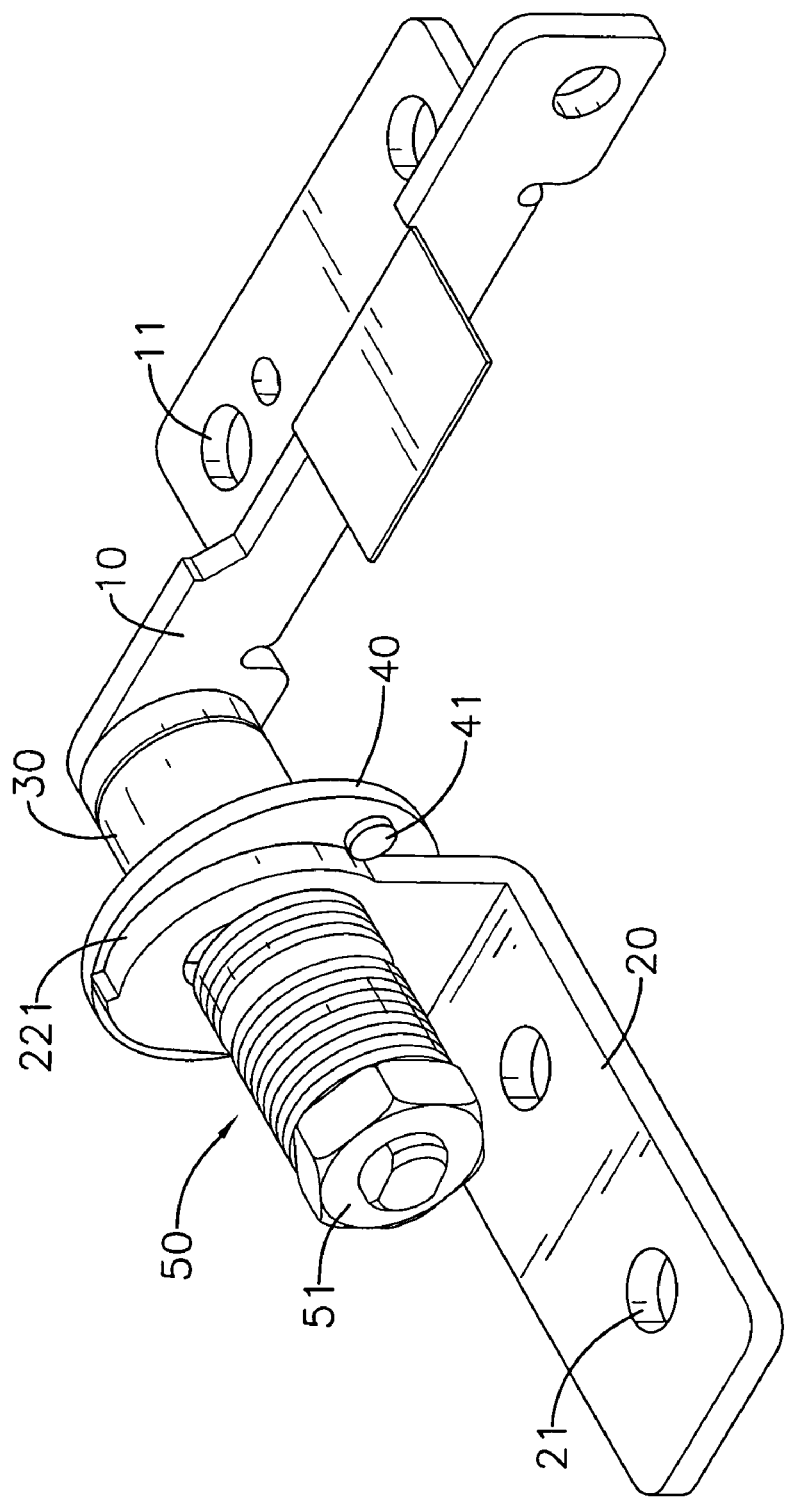
FIG. 1 is a perspective view of a pivotal-axis changing hinge in accordance with the present invention.
Figure 2:
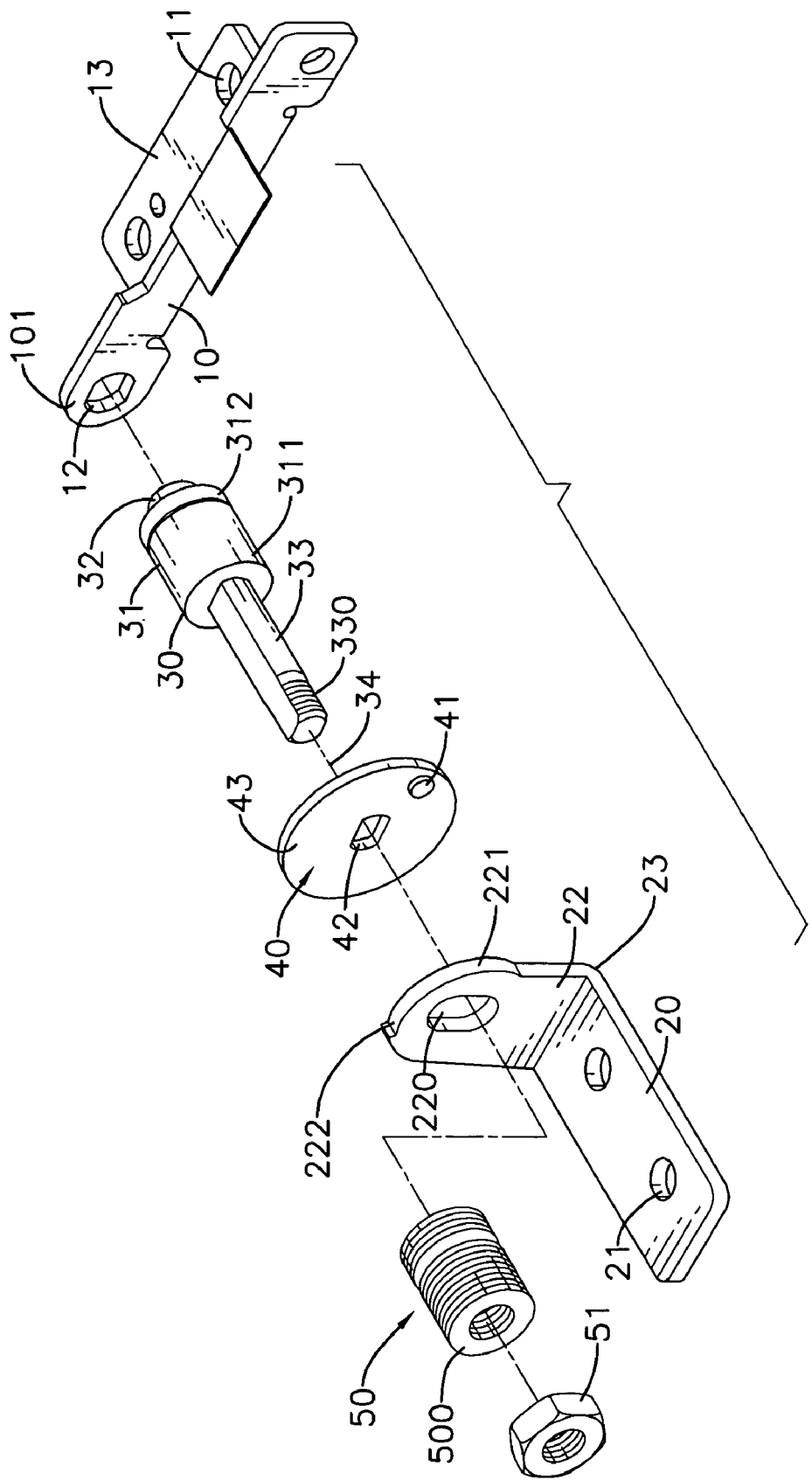
FIG. 2 is an exploded perspective view of the pivotal-axis changing hinge in FIG. 1.
Figure 3:
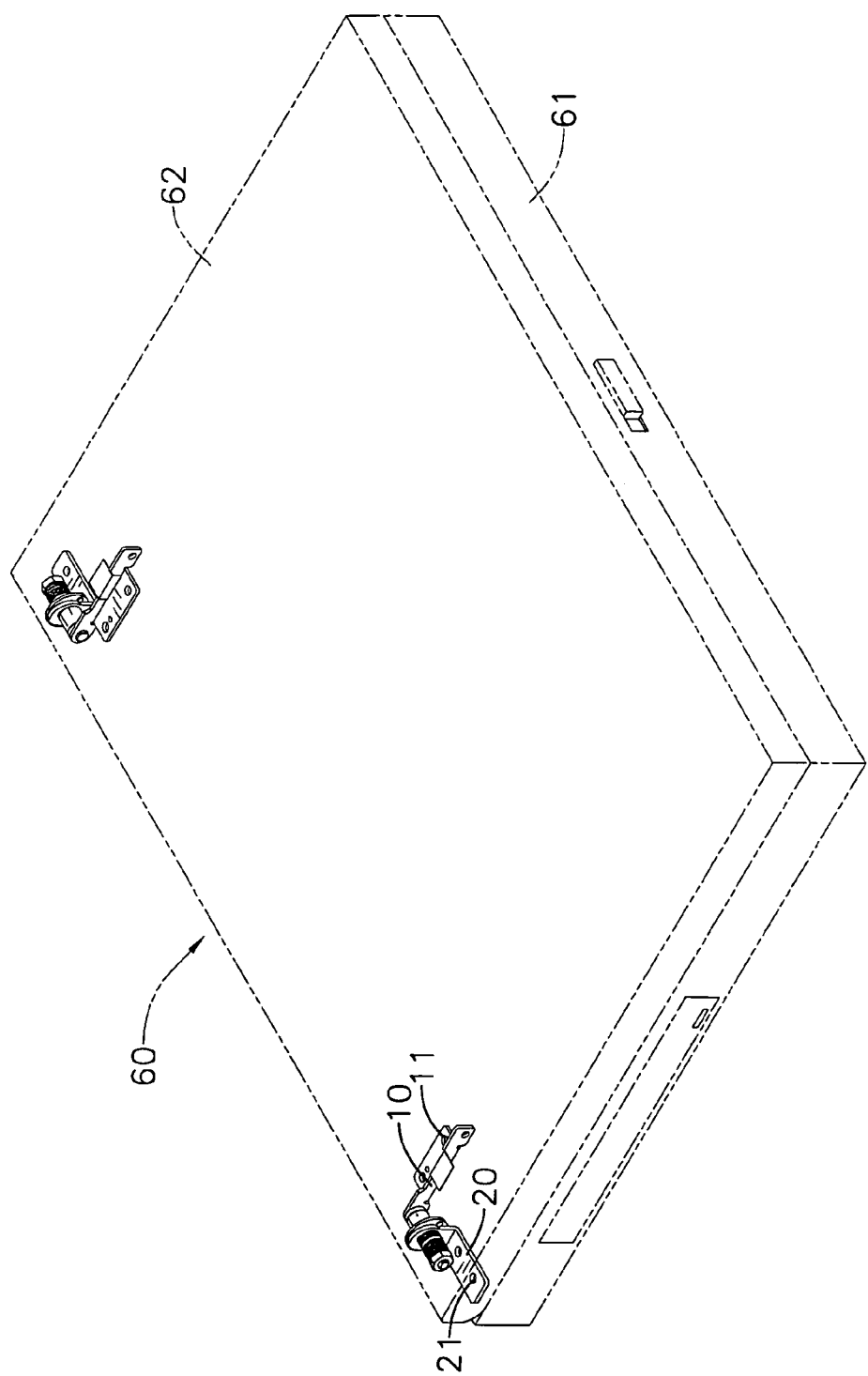
FIG. 3 is a perspective view of the pivotal-axis changing hinge in FIG. 1 mounted in a portable electronic device.
Figure 4:
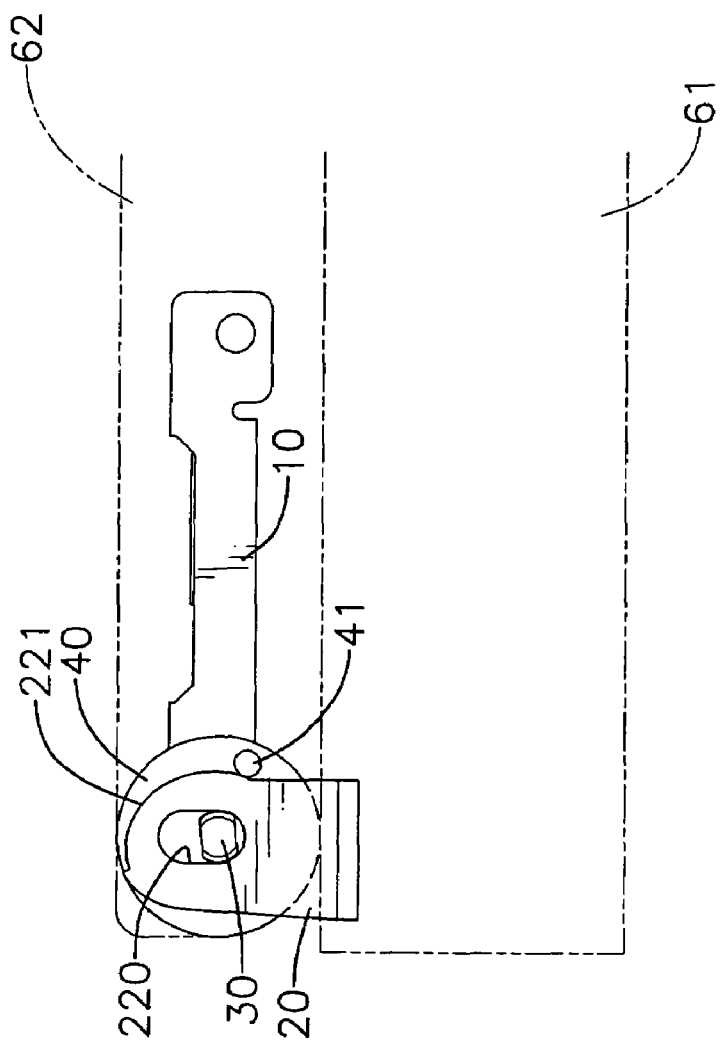
FIG. 4 is a side view of the pivotal-axis changing hinge in FIG. 3 mounted in the portable electronic device.

With reference to FIGS. 1, 2, 3 and 4, a portable electronic device (60) has a rear, a base (61), a cover (62) and two pivotal-axis changing hinges in accordance with present invention. The cover (62) has a proximal edge formed along the rear of the electronic device (60) and pointing towards the base (61) when the portable electronic device (60) is opened.

The pivotal-axis changing hinges are separately mounted between the base (61) and the cover (62), and each pivotal-axis changing hinge comprises a pivoting leaf (10), a stationary leaf (20), a pintle assembly (30), a cam (40), a securing element (51) and an optional spacing assembly (50).

The pivoting leaf (10) is mounted securely on the cover (62) of the portable electronic device (60) and has a pivoting end (101), a keyway (12), a mounting tab (13) and multiple fixing holes (11). The keyway (12) is formed through the pivoting end (101) of the pivoting leaf (10) and is non-circular. The mounting tab (13) is perpendicularly formed on the pivoting leaf (10). The fixing holes (11) are separately formed through the mounting tab (13) for securing the pivoting leaf (10) to the cover (62) with fasteners.

The stationary leaf (20) is mounted securely on the base (61) of the portable electronic device (60), and has a distal end, and a proximal end (23), a mounting bracket (22) and multiple fixing holes (21). The mounting bracket (22) is formed at the proximal end (23) perpendicular to the base (61) and has a top edge (222), an elongated gudgeon (220) and a parabolic edge (221). The elongated gudgeon (220) is formed through the mounting bracket (22) of the stationary leaf (20) near the top edge (222), corresponding to the keyway (12) of the pivoting leaf (10), and is elongated and elliptical and has a long axis formed perpendicular to the base (61). The parabolic edge (221) is formed on the top edge (222) of the mounting bracket (22) near the elongated gudgeon (220) and has a lower end and an upper end. The fixing holes (21) are separately formed through the stationary leaf (20) for securing the stationary leaf (20) to the base (61) with fasteners.

The pintle assembly (30) has a pivotal axis (34), a body (31), a key (32) and a pintle (33). The pivotal axis (34) is defined longitudinally through the pintle assembly (30). The body (31) may be cylindrical and has a proximal end (311) and a distal end (312). The key (32) protrudes from the distal end (312) of the body (31) along the pivotal axis (34), is non circular in cross section and extends through and engages with the keyway (12) of the pivoting leaf (10). The pintle (33) protrudes from the proximal end (311) of the body (31) along the pivotal axis (34), is non circular in cross section and has a threaded end (330), which extends through the elongated gudgeon (220) of the stationary leaf (20).

The cam (40) may be circular, is mounted on the pintle assembly (30) and is able to simultaneously rotate with the pintle assembly (30), and has a side surface (43), a center, a mounting hole (42) and a protrusion (41). The side surface (43) abuts the mounting bracket (22) of the stationary leaf (20). The mounting hole (42) is formed through the center of the cam (40), is non circular and is mounted on the pintle (33) of the pintle assembly (30) to allow simultaneous rotation of the pintle assembly (30) and the cam (40). The protrusion (41)

protrudes from the side surface (43) of the cam (40) and is mounted slidably along the parabolic edge (221) of the mounting bracket (22).

The securing element (51) may be a nut, is mounted securely on the threaded end (330) of the pintle (33) for securing the pivoting leaf (10), the stationary leaf (20), the pintle assembly (30) and the cam (40).

The spacing assembly (50) comprises multiple spacers (500) that are mounted around the pintle (33) between the body (31) of the pintle assembly (30) and the securing element (51) to provide friction to hold the pivoting leaf (10) in position relative to the stationary leaf (20).

Figure 5:
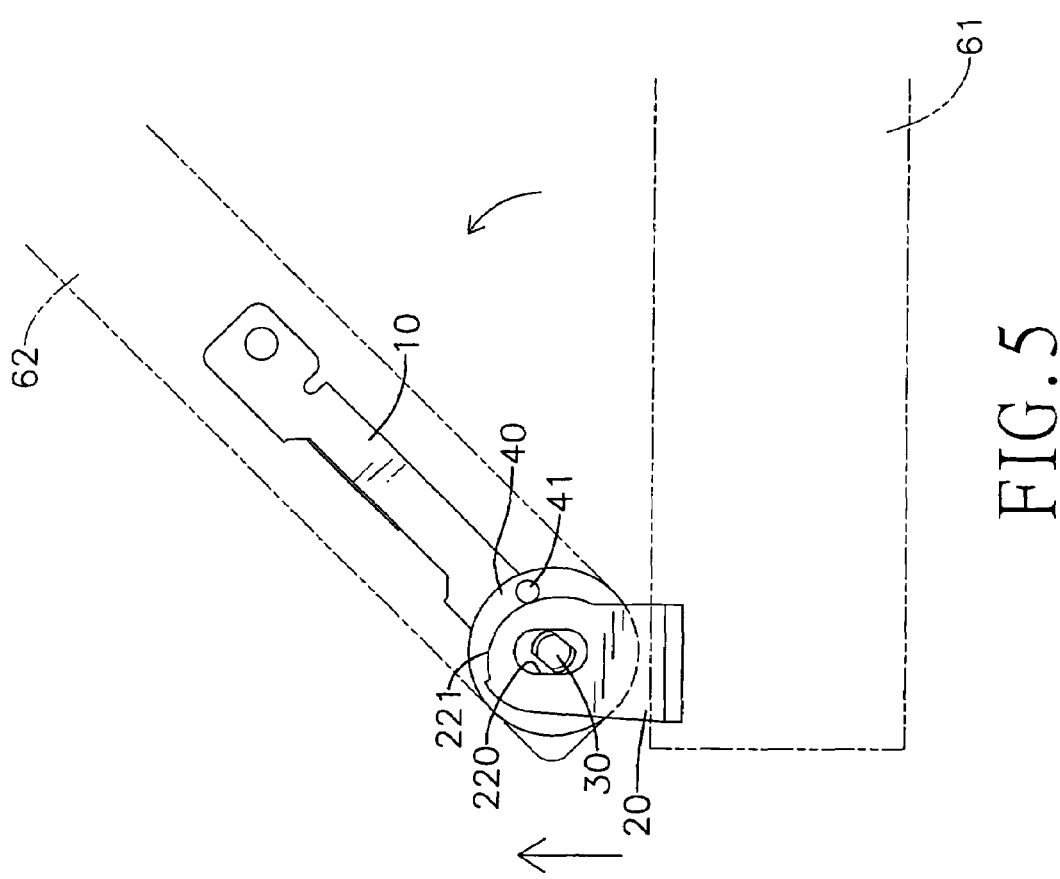
FIG. 5 is an operational side view of the pivotal-axis changing hinge in FIG. 3.
Figure 6:
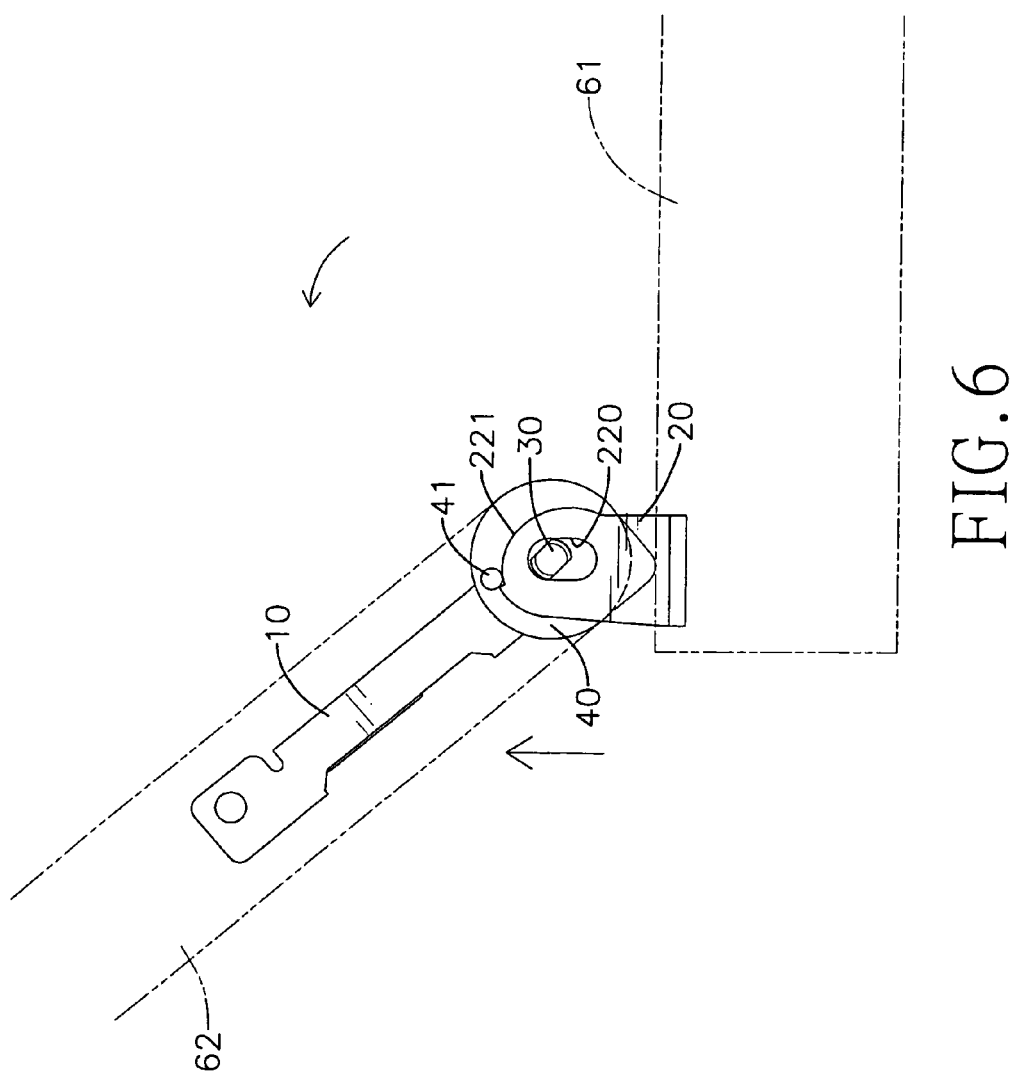
FIG. 6 is another operational side view of the pivotal-axis changing hinge in FIG. 3.

With further reference to FIGS. 5 and 6, when the cover (62) of the portable electronic device (60) is pivoted relative to the base (61), the pintle assembly (30) rotates and forces the cam (40) to rotate and the protrusion (41) of the cam (40) gradually slides along the parabolic edge (221) from the lower end to the upper end. Accordingly, the pintle assembly (30) moves perpendicularly away from the base (61), along the long axis of the elongated gudgeon (220). Therefore, the movement of the proximal edge of the cover (62) is kept from being limited by the base (61) and the rotating angle of the cover (62) is expanded. Therefore, the pivotal-axis changing hinge in accordance with present invention has an excellent operational performance and provides more convenience in using.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A pivotal changing hinge for mounting on a cover and a base of a portable device, comprising:
   a pivoting leaf having
      a pivoting end; and
      a keyway being formed through one end of the pivoting leaf and being non-circular;
   a stationary leaf having
      an elongated gudgeon being formed through the stationary leaf, corresponding to the keyway of the pivoting leaf, and being elongated and elliptic; and
      a parabolic edge being formed near the elongated gudgeon;
   a pintle assembly having a pivotal axis being defined longitudinally through the pintle assembly and extending through and engaging with the keyway of the pivoting leaf and the elongated gudgeon of the stationary leaf;
   a cam having
      a side surface abutting the stationary leaf;
      a center;
      a mounting hole being formed through the center of the cam, being non circular and mounted through by the pintle assembly to allow simultaneous rotation of the pintle assembly and the cam; and
      a protrusion protruding from the side surface of the cam and being mounted slidably along the parabolic edge of the stationary leaf;
   thereby when the cover is opened relative to the base, the protrusion of the cam slides along the parabolic edge of the stationary leaf to gradually lift the pintle assembly within the elongated gudgeon upwardly to prevent the cover from hitting the base.

2. The pivotal-axis changing hinge as claimed in claim 1, wherein the stationary leaf further has
   a proximal end;
   a mounting bracket being formed perpendicularly at the proximal end, and having a top edge;
   the elongated gudgeon is formed through the mounting bracket of the stationary leaf near the top edge; and
   the parabolic edge is formed on the top edge of the mounting bracket near the elongated gudgeon.

3. The pivotal-axis changing hinge as claimed in claim 2, wherein the pintle assembly has
   a body having
      a distal end; and
      a proximal end;
   a key protruding from the distal end of the body along the pivotal axis, being non circular in cross section and extending through and engage with the keyway of the pivoting leaf, and
   a pintle protruding from the proximal end of the body along the pivotal axis, being non circular in cross section and extending through the elongated gudgeon of the stationary leaf.

4. The pivotal-axis changing hinge as claimed in claim 3, wherein the pintle of the pintle assembly further has a threaded end; and
   a securing element is mounted securely on the threaded end of the pintle for securing the pivoting leaf, the stationary leaf, the pintle assembly and the cam.

5. The pivotal-axis changing hinge as claimed in claim 4 further has a spacing assembly comprising multiple spacers that are mounted around the pintle between the body of the pintle assembly and the securing element to provide friction to help the pivoting leaf positioning relative to the stationary leaf.

6. The pivotal-axis changing hinge as claimed in claim 5, wherein
   the pivoting leaf further has
      a mounting tab being perpendicularly formed on the pivoting leaf; and
      multiple fixing holes being separately formed through the mounting tab; and
   the stationary leaf further has multiple fixing holes being separately formed through the stationary leaf.

7. The pivotal-axis changing hinge as claimed in claim 6, wherein the body of the pintle is cylindrical.

8. The pivotal-axis changing hinge as claimed in claim 6, wherein the securing element is a nut.

9. The pivotal-axis changing hinge as claimed in claim 6, wherein the cam is circular.

* * * * *